(12) United States Patent
Seeger

(10) Patent No.: US 9,595,984 B2
(45) Date of Patent: Mar. 14, 2017

(54) CONCEPT FOR TRANSMITTING AND RECEIVING AN INFORMATION SYMBOL

(71) Applicant: ZF Friedrichshafen AG, Friedrichshafen (DE)

(72) Inventor: Martin Seeger, Freising (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 38 days.

(21) Appl. No.: 14/080,828

(22) Filed: Nov. 15, 2013

(65) Prior Publication Data

US 2014/0140434 A1  May 22, 2014

(30) Foreign Application Priority Data

Nov. 20, 2012  (DE) .......................... 10 2012 221 121

(51) Int. Cl.
*H04B 1/02* (2006.01)
*H04B 1/06* (2006.01)
(Continued)

(52) U.S. Cl.
CPC .............. *H04B 1/06* (2013.01); *H04L 27/02* (2013.01); *H04L 27/2278* (2013.01)

(58) Field of Classification Search
CPC ............................. H04L 27/02; H04L 27/2278
See application file for complete search history.

(56) References Cited

U.S. PATENT DOCUMENTS 5,063,571 A * 11/1991 Vancraeynest ................ 375/130
5,938,787 A    8/1999 Stark
(Continued)

FOREIGN PATENT DOCUMENTS

DE         101 28 353 A1    1/2003

OTHER PUBLICATIONS

German Search Report Corresponding to 10 2012 221 121.7 mailed Jul. 2, 2013.

*Primary Examiner* — Ross Varndell
(74) *Attorney, Agent, or Firm* — Davis & Bujold, PLLC; Michael J. Bujold

(57) ABSTRACT

Devices, methods and examples concerning a concept for transmitting an information symbol from a symbol alphabet ($I_0$; $I_1$; $I_2$; $I_3$). For a first information symbol ($I_1$) from the symbol alphabet, a first signal sequence ($S_1$) is transmitted. For a second information symbol ($I_2$) of the symbol alphabet, a second signal sequence ($S_2$) is transmitted. A cross-correlation between the first signal sequence ($S_1$) and the second signal sequence ($S_2$) is lower than a predetermined cross-correlation threshold ($\Psi_{threshold}$). For a third information symbol ($I_3$) of the symbol alphabet, a third signal sequence ($S_3$) is transmitted such that both a cross-correlation between the third signal sequence ($S_3$) and the first signal sequence ($S_1$) and also a cross-correlation between the third signal sequence ($S_3$) and the second signal sequence ($S_2$) are above the predetermined cross-correlation threshold ($\Psi_{threshold}$).

10 Claims, 7 Drawing Sheets

(51) Int. Cl.
*H04L 27/02* (2006.01)
*H04L 27/227* (2006.01)

(56) References Cited

U.S. PATENT DOCUMENTS

| | | | |
|---|---|---|---|
| 6,353,406 B1* | 3/2002 | Lanzl | G01S 13/84 340/10.1 |
| 6,418,133 B1* | 7/2002 | Zhang et al. | 370/342 |
| 6,812,824 B1* | 11/2004 | Goldinger | G06K 17/00 340/10.1 |
| 2002/0097781 A1 | 7/2002 | Bejjani et al. | |
| 2004/0120424 A1* | 6/2004 | Roberts | 375/327 |
| 2004/0136399 A1* | 7/2004 | Roberts | 370/468 |
| 2008/0318528 A1 | 12/2008 | Hooli et al. | |
| 2009/0196613 A1 | 8/2009 | Linnartz | |

* cited by examiner

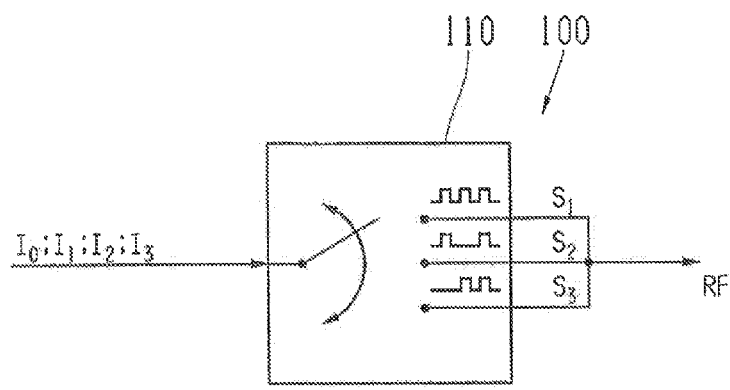
Fig. 1a
Fig. 1b
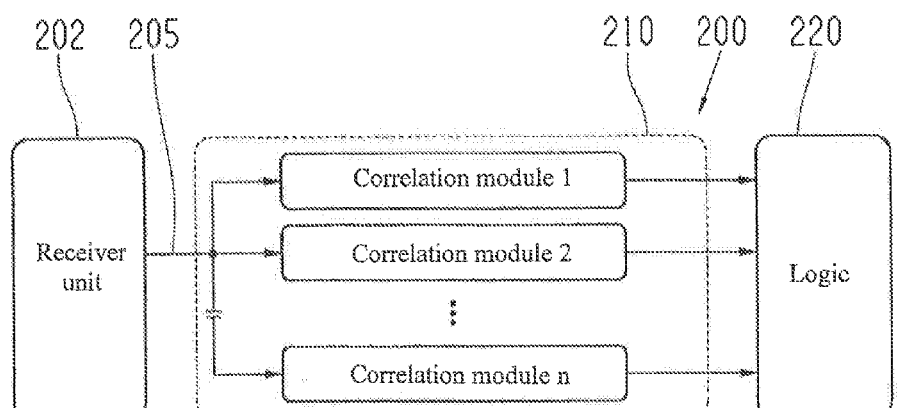
Fig. 2

| max ($\psi_{xy}$) | Code_01 | Code_10 | Code_11 |
|---|---|---|---|
| Code_01 | 1 | 0.6875 | 0.8603 |
| Code_10 | 0.6875 | 1 | 0.8603 |
| Code_11 | 0.8603 | 0.8603 | 1 |

Fig. 6a

| | Code_01 | Code_10 | Code_11 |
|---|---|---|---|
| HNV | 2 | 2 | 2 |

Fig. 6b

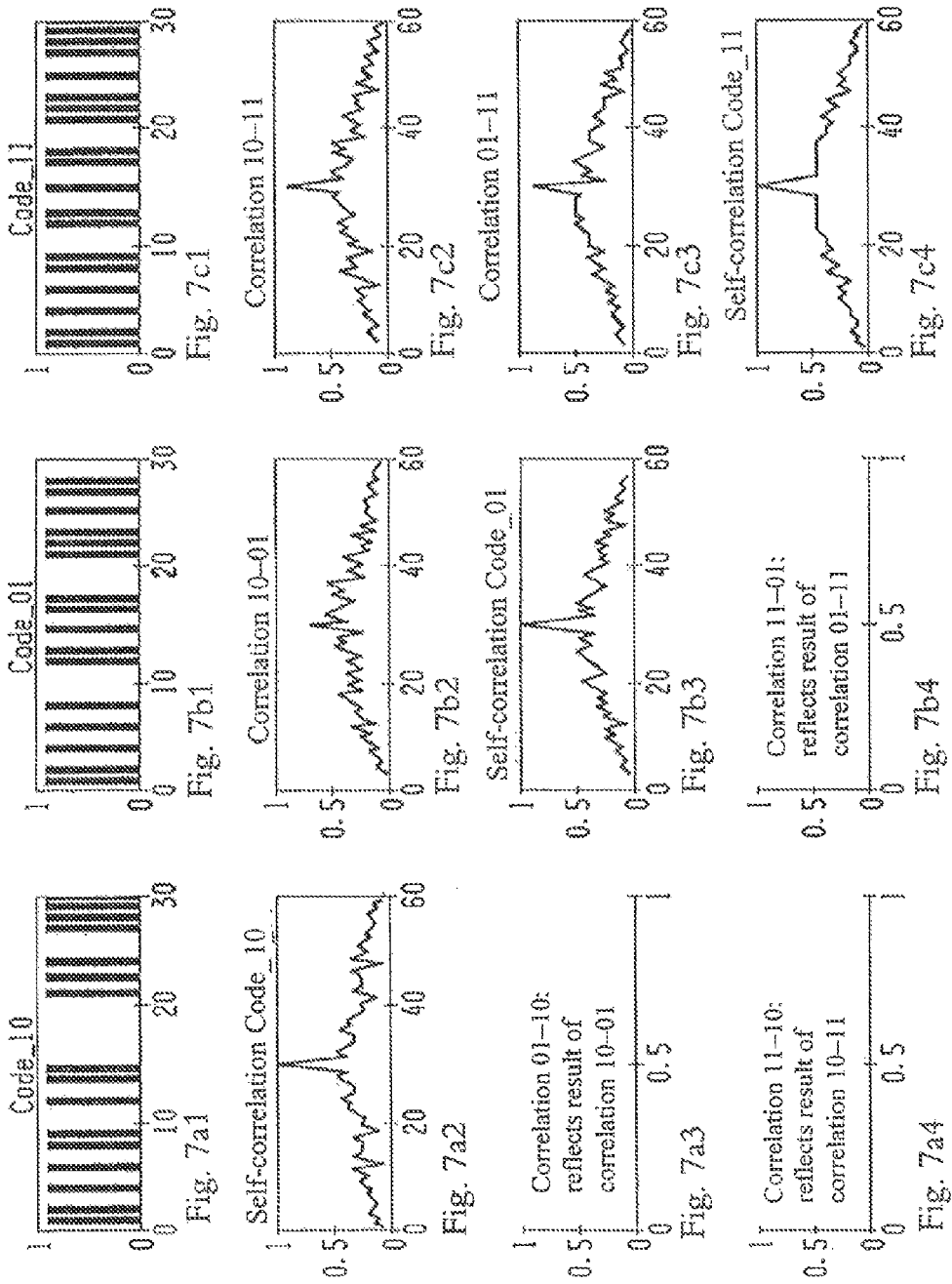

CONCEPT FOR TRANSMITTING AND RECEIVING AN INFORMATION SYMBOL

This application claims priority from German patent application serial no. 10 2012 221 121.7 filed Nov. 20, 2012.

FIELD OF THE INVENTION

Example embodiments of the present invention generally concern communications systems and in particular devices for transmitting and/or receiving information symbols, as can be used for example in wire-connected or wireless sensor systems.

BACKGROUND OF THE INVENTION

For transferring multi-valued information symbols, for example M-valued symbols (with $M=2^n$), there exist in communications technology various (digital) modulation methods such as Frequency Shift Keying M-FKS, Phase Shift Keying M-PSK, or Quadrature Amplitude Modulation M-QAM. Such higher-level digital modulation methods enable the transfer of higher-valued information symbols, which can considerably increase the data transfer rate compared with the transfer of information symbols from an only low-valued (for example binary, i.e. M=2) symbol alphabet. In general the modulation of the data of higher-level-modulated signals demands a more complex receiver unit. Likewise, higher-level-modulated signals are more prone to disturbances such as noise or inter-symbol interferences (ISI), which results in a greater bit-error probability at the receiver.

Compared with simpler modulation methods such as the so-termed OOK modulation, (OOK=On-Off-Keying), the above-mentioned modulation methods (M-PSK, M-QAM, etc.) are more complex and in particular they require more energy for wireless data transfer. Whereas with FSK-, PSK- or QAM-modulations data to be transmitted are modulated on a permanently existing carrier, in contrast, with binary OOK modulation a carrier signal is only transmitted when, for example, a "1" is to be transferred: see FIG. 8a which shows a datum to be transmitted, FIG. 8b which shows an OOK signal resulting therefrom and FIG. 8c which shows a FSK signal corresponding to the datum. Thus, with OOK the information is modulated at the amplitude of the carrier signal ("0"=carrier off, "1"=carrier on). Accordingly, with OOK or on-off-keying energy is not required permanently for the transmission of information (for example, long "0" sequences need no energy). A disadvantage, however, is that in substantially weakened reception signals the strength can fall below a limit value so that a "1" is detected as a "0". Thus, for stable data transfer with OOK it is used to use slower data transfer rates.

In order to be able with OOK or on-off-keying to transfer multi-valued information symbols, for the transfer so-termed spreading codes in the form of binary sequences can be transmitted, which can be demodulated for example by a correlation receiver. In this case each individual information symbol that has to be transmitted corresponds to a spreading code that comprises a plurality of bits (or chips). Use is made of the fact that there are particular binary sequences which, by virtue of good correlation results, can be recognized clearly by correlation modules despite disturbances. If there are several correlation stages in a receiver, then it is possible to distinguish more information symbols. For example, DE 10128353 A1 describes a method in which m spreading codes represent m symbols. In a corresponding receiver, for each of the spreading codes a corresponding correlation module is then needed in order to be able to detect an information symbol associated with the spreading code concerned. In a 2-valued or binary symbol alphabet (i.e. $M=2^1$), a first spreading or binary code can be associated with the first symbol (e.g. "0") and a second spreading or binary code with the second symbol (e.g. "1"). Depending on the information symbol to be transmitted, the respective associated spreading codes can then be transferred from a transmitter to a receiver as an on-off-keying sequence, i.e. as an OOK-modulated binary sequence. On the part of the receiver it is then only necessary for a logic unit to count the interrupts (interruption commands) triggered by the spreading codes or OOK-modulated binary sequences.

However, with a 2-valued symbol alphabet only comparatively low data rates are possible. It is therefore desirable to transmit information symbols of a higher-valued symbol alphabet (M>2) by way of signal sequences associated with the information symbols that can be transmitted in an energy-efficient manner, and thereby at the same time to minimize the switching or signal processing complexity of a receiver.

SUMMARY OF THE INVENTION

Accordingly, one objective of the present invention is to enable data transfer as energy-efficiently as possible, with the least switching complexity on the part of the receiver.

This objective is achieved by a transmitting device and a corresponding transmission method, and by a receiving device and a corresponding reception method, according to the invention.

According to a further aspect of the present invention a computer program is proposed, with a program code for implementing at least one of the methods when the computer program is run on a programmable hardware component such as a digital signal processor (DSP) or a so-termed field programmable gate array (FPGA).

According to a first aspect, example embodiments of the present invention comprise a device for transmitting an information symbol of a multi-valued symbol alphabet, for example by means of on-off-keying or OOK modulation. In this case example embodiments can be used particularly advantageously for signal alphabets of size $M=2^n \geq 4$ (i.e. $n \geq 2$). The device comprises a transmitter designed to transmit, for a first information symbol of the multi-valued symbol alphabet, a first signal sequence such as a binary sequence, and for a second information symbol of the symbol alphabet (different from the first information symbol) to transmit a second signal sequence, such that a cross-correlation or cross-correlation value between the first signal sequence and the second signal sequence is lower than a predetermined cross-correlation threshold. Furthermore the transmitter is designed, for a third information symbol of the symbol alphabet, to transmit a third signal sequence such that both a cross-correlation between the third signal sequence and the first signal sequence and also a cross-correlation between the third signal sequence and the second signal sequence, is above the predetermined cross-correlation threshold. The signal sequences can all be binary signal sequences, which can be transferred by means of OOK modulation from the transmitter to an appropriate receiver.

The information symbols of the multi-valued symbol alphabet can for example be whole numbers, each represented by a combination of information bits (0, 1). Expressed in other words a number of n information bits of an information bit stream can be represented by $2^n$ information symbols of the $2^n$-valued information symbol alphabet. In order, in turn, to be able to transmit the $2^n$-valued information symbols advantageously by means of on-off-keying (OOK), to each individual symbol of the symbol alphabet can be assigned binary signal sequences or on-off-keying sequences. The signal sequences can also be regarded as binary spreading sequences, i.e. as a sequence of N bits ("0" and "1") that characterizes the information symbol concerned. These binary signal sequences, which in what follows will also be referred to as OOK sequences, can be transferred in a very energy-saving manner since, for example, a carrier signal is only transmitted when a "1" of an OOK sequence occurs. In many example embodiments an OOK sequence that corresponds to an information symbol can have, for example, N=31 bits. Obviously, depending on the embodiment and the application concerned, any other sequence lengths can be set. The choice of the sequence length is influenced above all by the data rate desired and by the quality of the transmission channel.

In many example embodiments the OOK sequences assigned to the symbols can be pseudo-noise sequences (PN sequences). The model for this is an analog, random noise x that only coincides with itself at $\Psi_{xx}(\tau=0)=1$, i.e. at the point $\tau=0$ in the autocorrelation function. Furthermore, it is possible to find the OOK or spreading sequences by means of certain generator-polynomials (for example gold-codes) with good self-correlation. In addition, suitable codes can be found by repeated "trial and error". The first, second and third signal sequences or OOK sequences should in each case have as good autocorrelation properties as possible. Moreover, the signal sequences should be chosen such that the cross-correlation between the first signal sequence and the second signal sequence is below the predetermined cross-correlation threshold. In other words, the cross-correlation between the first and second signal sequences should be as small as possible. In contrast, the third signal sequence should be chosen such that a cross-correlation between the third signal sequence and the first signal sequence is above the cross-correlation threshold. Likewise, the cross-correlation between the third signal sequence and the second signal sequence should be above the cross-correlation threshold. The cross-correlations or cross-correlation values at the point $\tau=0$ between the third signal sequence and the other two signal sequences should therefore be as high as possible, so that in receiver-side correlation modules for the first and second signal sequences the third signal sequence can in each case also trigger coincidences.

If for a fourth information symbol (e.g. "0") of the multi-valued symbol alphabet no OOK modulated signal sequence is sent (which, for the receiver, also represents information), then with example embodiments of the present invention, $2^n$-valued information symbols can be transmitted with $2^n-1$ different signal sequences or OOK sequences. By the special choice of the cross-correlation property between the individual signal sequences or spreading sequences, on the part of the receiver the $2^n$-valued information symbol can be detected by virtue of only n different correlation modules. In this case the n different correlation modules correspond to those n different signal or OOK sequences which reciprocally have a low cross-correlation in each case, i.e. a cross-correlation below the predetermined correlation threshold.

By the sequential or serial transmission of the information-symbol-specific OOK-modulated signal sequences, example embodiments enable a particularly energy-efficient transmission concept which can be used, for example, in the context of wireless sensor systems and/or wireless sensor networks. In many example embodiments a transmitter can therefore be designed to transmit the information-symbol-specific signal sequences serially by means of wireless OOK modulation to a receiver device by way of a radio interface.

According to a second aspect, a device for receiving an information symbol from a received signal is proposed. The device comprises a correlation stage which is designed such that in the event that a cross-correlation between a first signal sequence which corresponds to a first information symbol from a signal alphabet and the received signal is above a defined correlation threshold, the first information symbol is registered. Furthermore, the correlation stage is designed such that if a cross-correlation between a second signal sequence which corresponds to a second information symbol from the symbol alphabet and the received signal is above the predetermined correlation threshold, the second information symbol is registered. In addition the correlation stage of the receiver device is designed such that both when a cross-correlation between the first signal sequence and the received signal and also when a cross-correlation between the second signal sequence and the received signal are each above the predetermined correlation threshold, a third information symbol from the symbol alphabet is registered. In other words, example embodiments of the present invention also comprise a receiving device that corresponds to the above-described transmitting device.

In example embodiments the predetermined cross-correlation threshold is smaller than any autocorrelation value (at the point $\tau=0$) of the three information-symbol-specific signal sequences and larger than a cross-correlation value (at the point $\tau=0$) between the first and the second signal sequences, which correspond respectively to the first and second information symbols.

According to further aspects of the present invention provision is made for methods of transmitting and receiving a multi-valued information symbol, such that the information symbol can be transferred/transmitted by means of on-off-keying or OOK modulation. A method for transmitting in this case comprises the following steps:

for a first information symbol from the symbol alphabet, transmitting a first symbol-specific signal sequence, for a second information symbol from the symbol alphabet, transmitting a second symbol-specific signal sequence, so that a cross-correlation between the first signal sequence and the second signal sequence is below a predetermined cross-correlation threshold, and for a third information symbol from the symbol alphabet, transmitting a third signal sequence, so that both a cross-correlation between the third signal sequence and the first signal sequence, and also a cross-correlation between the third signal sequence and the second signal sequence, are each above the predetermined cross-correlation threshold.

On the other hand, a method for receiving an information symbol transmitted by the above transmission method comprises the following steps.

in the case that a cross-correlation between a first signal sequence which corresponds to a first information symbol from a symbol alphabet and a received signal is above a predetermined correlation threshold, registering the first information symbol, if a cross-correlation between a second signal sequence which corresponds to the second information symbol from the symbol alphabet and the received signal is above the predetermined correlation threshold, registering the second information symbol, and if both a cross-correlation between the first signal sequence and the received signal and also a cross-correlation between the second signal sequence and the received signal are each above the predetermined correlation threshold, registering a third information symbol from the symbol alphabet.

Example embodiments make it possible, at a point in time or in a symbol interval, to transmit an information symbol from a symbol alphabet with a symbol stock of $2^n$ instead of only n when the receiver is using only n correlation modules. This enables the complexity of the hardware and/or the current consumption to be reduced, since only n correlation modules are needed instead of $2^n$ (or $2^n-1$). In addition or alternatively, the information rate of the transmission can be increased by the factor $2^n/n$. In the second case (increase of the data rate) the increase has no effect on the current consumption since no additional system blocks are needed.

A further advantage of example embodiments is that the information symbols do not have to be obtained by a higher-level modulation. The higher-valued symbols or their signal sequences can be produced by means of the simple binary OOK modulation process, which is of interest for simple and energy-efficient transmission systems.

BRIEF DESCRIPTION OF THE DRAWINGS

Example embodiments of the present invention are explained in more detail with reference to the attached figures, which show:

FIG. 1a: A schematic representation of an example embodiment of a device for transmitting an information symbol;

FIG. 1b: Representation of a table to explain the initiation of correlation modules concerning various signal sequences;

FIG. 2: A schematic representation of an example embodiment of a device for receiving an information symbol;

FIG. 6a: A table with autocorrelation and cross-correlation values between various OOK sequences;

FIG. 6b: HNVs of three binary sequences, according to an example embodiment:

FIGS. 7a1-7c4: A representation of three different and symbol-specific binary sequences, with autocorrelations and cross-correlations.

DETAILED DESCRIPTION OF THE PREFERRED EMBODIMENTS

Figure 3A:
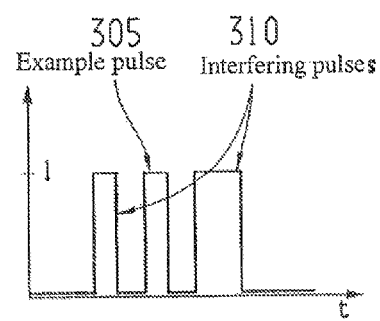
FIGS. 3a, 3aa: An example of perturbed pulses and a correlation result altered by the perturbation.
Figure 3A:
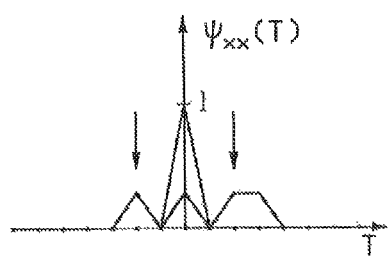

In the following exemplary description of some example embodiments of the present invention, the same indexes denote the same, similar or functionally equivalent units or components.

FIG. 1a shows a schematic block diagram of a device 100 for transmitting an information symbol from a symbol alphabet $I_0$, $I_1$, $I_2$, $I_3$, for example by means of an on-off keyed or OOK modulated transmission signal. Although example embodiments of the present invention can generally be used with $2^n$-valued (n≥2) symbol alphabets, for the sake of better understanding the principles of example embodiments of the present invention are described below with reference to a $2^2$=4-valued symbol alphabet. In such a 4-valued symbol alphabet, without placing any restriction on generality, the following values can apply: $I_0$=0, $I_1$=1, $I_2$=2, $I_3$=3.

The device 100 comprises a digital and/or analog transmitter unit 110, which is designed to transmit for a first information symbol $I_1$ from the symbol alphabet a first spreading or binary sequence $S_1$, which can also be referred to as an on-off-keying sequence. Furthermore, the transmitter unit 110 is designed to transmit for a second information symbol $I_2$ of the symbol alphabet, a second spreading or binary sequence $S_2$ (different from $S_1$). The two spreading sequences or codes $S_1$ and $S_2$ are chosen in such manner that a cross-correlation (at the point τ=0) between the first spreading sequence $S_1$ and the second spreading sequence $S_2$ is below a predetermined cross-correlation threshold $\Psi_{threshold}$. In other words, the two sequences $S_1$ and $S_2$ that correspond to the symbols $I_1$ and $I_2$ have a comparatively small cross-correlation relative to one another, in the ideal case zero. The transmitter unit or transmitter 110 is also adapted to transmit a third binary sequence $S_3$ (different from $S_1$ and $S_2$) for a third information symbol $I_3$ from the symbol alphabet. This third binary sequence has the property that both a cross-correlation between the third binary sequence $S_3$ and the first binary sequence $S_1$ and (at the same time) also a cross-correlation between the third binary sequence $S_3$ and the second binary sequence $S_2$ are above the predetermined cross-correlation threshold $\Psi_{threshold}$. In other words: both the cross-correlation between the third and first sequences and also the cross-correlation between the third and second sequences are comparatively large, ideally infinite or unity (in the case of standardization).

The signal sequences $S_1$, $S_2$, $S_3$ chosen can be used to modulate a radio or carrier signal (RF signal, RF=Radio Frequency) by means of on-off-keying (OOK). For a particularly energy-efficient transfer, the information-symbol-specific binary sequences $S_1$, $S_2$ and $S_3$ are transmitted sequentially by on-off-keying corresponding to the binary values of the sequences $S_1$, $S_2$, $S_3$. Whenever a sequence $S_1$, $S_2$, $S_3$ has the value "0" at some point, no energy has to be expended for the transmission. Likewise, for a fourth information symbol $I_0$=0 of the symbol alphabet no binary sequence or signal sequence at all has to be chosen and transmitted. Instead, during the corresponding symbol or transmission interval nothing is transmitted, so that in that interval a corresponding receiver will receive only thermal noise or interference.

As can be seen from FIG. 1b, each information symbol $I_0$, $I_1$, $I_2$ and $I_3$ can be represented by a combination of n=2 binary digits. Consequently the transmitter unit or transmitter 110 can be designed to transmit the first binary sequence or Code A when a first binary digit of the information symbol $I_1$ corresponding thereto has the value "1" and a second binary digit of the information symbol corresponding to the second binary sequence $S_2$ has the value "0". The second binary sequence $S_2$ or Code B can be transmitted when the second binary digit of the information symbol corresponding thereto has the value "1" and in contrast the first binary digit of the information symbol has the value "0". Moreover, the third binary sequence $S_3$ can be transmitted when (at the same time) both the first and the second binary digits of the information symbol each have the value "1". Owing to the high cross-correlation of the third sequence $S_3$ with the other two sequences $S_1$, $S_2$, when the third sequence $S_3$ is transmitted this triggers in the receiver correlation modules tuned to the other two sequences $S_1$ and $S_2$, since in each case the predetermined correlation threshold $\Psi_{threshold}$ is exceeded. This "triggering" is represented in FIG. 1b by the two "X"s in the columns "Code A" and "Code B".

A receiving device 200 that corresponds to the transmitting device 100 is represented schematically in the block diagram of FIG. 2.

Besides a receiving unit 202 (for example a radio front end), which is designed to receive a wireless, OOK-modulated reception signal 205, the receiving device 200 comprises a correlation device or stage 210, which can in general comprise n correlation modules (for a $2^n$-valued symbol alphabet), wherein each of the n correlation modules is designed to correlate the received signal 205 with a corresponding signal sequence or binary sequence $S_n$. In the example embodiment currently being described, for the transmission of $2^2=4$-valued symbols the correlation stage 210 can comprise n=2 correlation modules that correspond to the two poorly correlating signal sequences $S_1$ and $S_2$.

In example embodiments, the correlation stage 210 is designed such that in the event of a cross-correlation between the first signal sequence $S_1$ (see correlation module 1) which corresponds to the first information symbol $I_1=1$ of the symbol alphabet and the received signal 205, which cross-correlation is above the predetermined correlation threshold $\Psi_{threshold}$ (and when at the same time there is a cross-correlation between the second signal sequence—see correlation module 2) which corresponds to the second information symbol $I_2=2$ of the symbol alphabet and the received signal 205, which cross-correlation is below the predetermined correlation threshold $\Psi_{threshold}$, the first information symbol $I_1$ is registered. Furthermore, the correlation stage 210 is designed such that if there is a cross-correlation between the second signal sequence $S_2$ (see correlation module 2) which corresponds to the second information symbol $I_2$ of the symbol alphabet and the received signal 205, which cross-correlation is above the correlation threshold $\Psi_{threshold}$ (and when at the same time there is a cross-correlation between the first signal sequence $S_1$ and the received signal 205 which is below the predetermined correlation threshold $\Psi_{threshold}$), the second information symbol $I_2$ is registered. In the example embodiments of the present invention the correlation stage 210 is also designed such that when a cross-correlation between the first sequence $S_1$ and the received signal 205 and also (at the same time) a cross-correlation between the second sequence $S_2$ and the received signal 205 are both above the predetermined correlation threshold $\Psi_{threshold}$, the third information symbol $I_3$ from the symbol alphabet $I_0$, $I_1$, $I_2$ and $I_3$ is registered. In a logic stage 220 connected downstream from the correlations state 210, a conclusion can then be reached about the information transmitted (for example the bit stream on which it is based).

Below, necessary properties of the spreading or binary sequences $S_1$, $S_2$ and $S_3$ will be examined in more detail. Example embodiments of the present invention require code groups for these, with which $2^n$-valued (e.g. 4-valued) symbols can be represented. Independently of the use of the codes or sequences, all the sequences $S_1$, $S_2$ and $S_3$ should in each case have very good self-correlation (autocorrelation function, ACF), in order to enable reliable detection in the correlation receiver 200. Mathematically, this requirement can be described by the relationships:

$$\Psi_{xx}(0)=1 \text{ or else } \Psi_{xx}(\tau)\ll1 \quad (1)$$

in which $\Psi_{xx}(T)$ is the autocorrelation and $\tau$ is the time shift. In accordance with this condition, an optimum code is shown by the example of FIGS. 3a, 3aa: within a time interval T only at one time point is a "1" transmitted, and otherwise only "0"s. The signal 305 has very good self-correlation: only at the time point $\tau=0$ does the function match itself, otherwise it shows no similarities. Theoretically, this is a desirable fact. In practice, however, repeated use of the radio channel results in perturbations and interferences, so that the code 305 is masked by other signals 310 and can no longer be recognized clearly in the correlation stage 210, see FIG. 3aa.

The quality of binary signal sequences can be described by the so-termed main-to-secondary peak ratio (HMV). The HNV is the ratio of the main peak to the highest secondary peak in the autocorrelation of a signal:

$$HNV + \frac{\Psi_{xx}(0)}{\max|\Psi_{xx}(m)|}, \quad (2)$$

$$\forall m \neq 0$$

For a bad code the HNV→1, while for a good code the HNV→∞. With the help of the HNV a quality of the code in relation to perturbations can also be determined. A code with a low HNV has high secondary maxima and, as the example calculation below shows, is unreliable in relation to perturbations: for example, as the correlation limit or correlation threshold in a signal sequence of length N=31, 5 bit errors are tolerated, which corresponds to a limit value:

$$\Psi_{threshold} = \Psi_{xx}(T) = \frac{31-5}{31} \approx 0.839 \quad (3)$$

In the case of a code with a bad $HNV_{bad}=1.3$ the value of the secondary maximum at the point $\tau_{NM}$ is:

$$\Psi_{xx}(T_{NM}) = \frac{1}{HNV_{bad}} \approx 0.769. \quad (4)$$

Figure 3B:
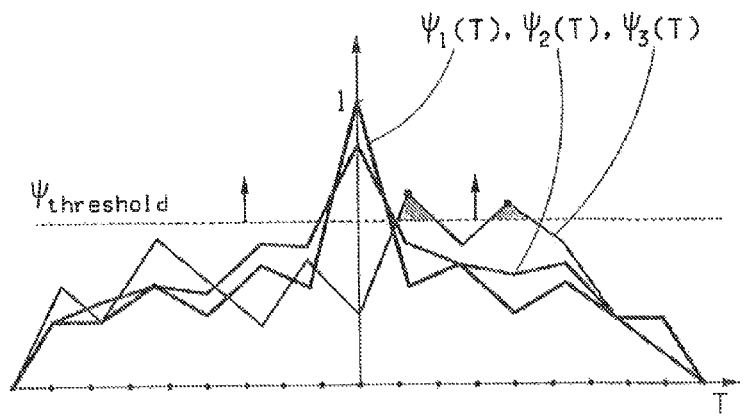
FIG. 3b: An example of a correlation threshold $\Psi_{threshold}$ that has been chosen too low.

This corresponds to a match of 24 bits. Now, if in a transmission there occur more bit errors than:

$$x(\Psi_{threshold}-\Psi_{xx}(T_{NM}))\cdot31=(0.839-0.769)\cdot31=2.17 \quad (5)$$

the correlation module 210 erroneously triggers an interrupt. In contrast, in the case of a good code with $HNV_{good}=2$, the code allows about 10 bit errors. At this point it should be mentioned that the choice of correlation limit or correlation threshold $\Psi_{threshold}$ is an important parameter of the correlation receiver 200. Whereas a threshold $\Psi_{threshold}$ that is too high tolerates almost no errors or even none at all, while it is true that a threshold $\Psi_{threshold}$ which has been chosen too low allows more errors, other signals too are wrongly recognized as correct. In an example embodiment the $\Psi_{threshold}$ can be adapted dynamically. If a received spreading code triggers a match in the correlation module 210 whose correlation result is above the current threshold, then in many example embodiments the threshold $\Psi_{threshold}$ can be raised, i.e. adapted dynamically to the transmission conditions (see FIG. 3b).

Figure 4A:
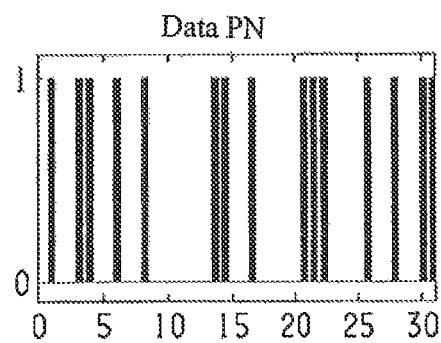
FIGS. 4a, 4aa: An example of a PN sequence of length N=31 with the correlation result and the main-to-secondary peak ratio (HNV)
Figure 4A:
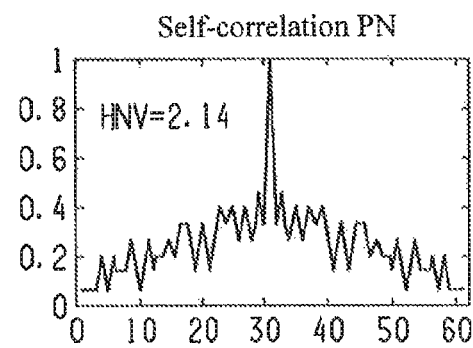

There are many possible ways of generating codes $S_1$, $S_2$, $S_3$ that have very good self-correlation with a high HNV. The simplest method is to produce pseudo-noise sequence, (abbreviated to PN sequences). Similarly to analog noise with which the autocorrelation, namely:

$$\Psi_{xx}(m)=\delta(m) \tag{6}$$

satisfies the condition expressed by equation (1), a similar property can be expected from the PN sequences. FIGS. 4a and 4aa show a random binary sequence of length N=31 and m=15 with good HNV.

Figure 4B:
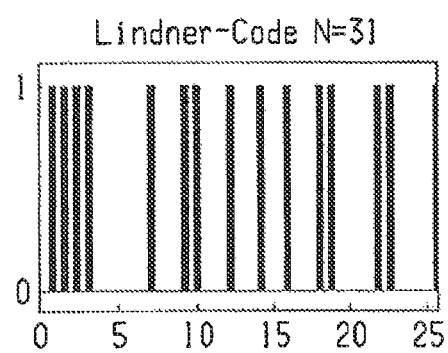
FIGS. 4b, 4bb: A Lindner Code of length N=31 with correlation result and HNV.
Figure 4B:
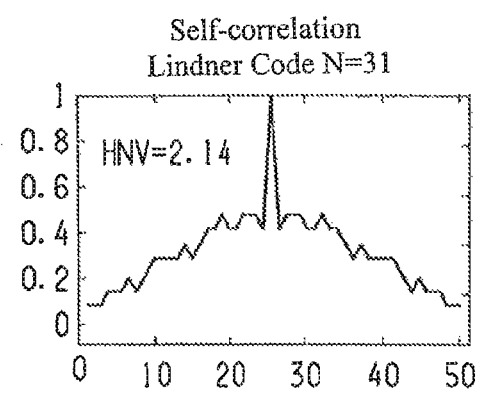

Using a correlation computer to test every combination, in 1975 Lindner found that for a code length N=31 there were 502 codes of high quality. An example of such a Lindner code is shown in FIGS. 4b and 4bb. The fact that out of $2^{31}$ possibilities only 502 have good characteristics shows that although the selection of codes is not an insoluble problem, it is not a trivial one.

To be able to transmit a 4-valued information symbol, a code (third signal sequence) is sought, which simultaneously triggers interrupts A and B, i.e. such that both a cross-correlation between the third binary sequence $S_3$ and the first binary sequence $S_1$ and also a cross-correlation between the third binary sequence $S_3$ and the second binary sequence $S_2$ are above the predetermined cross-correlation threshold $\Psi_{threshold}$. This is only possible when the third code "Code_11" is very similar to the first and second codes "Code_01" and "Code_10" and both of the associated correlation stages notify a match (see FIG. 5a). However, "Code_10" and "Code_01" should not show any similarity to one another, since otherwise erroneous triggerings may occur (see FIG. 5b). The fourth symbol can be defined such that no interrupt is triggered. For such a case, an additional mechanism can be provided in the hardware and/or software, since the case "No Triggering" is not recognized just as it stands.

Figures 5A, 5B, 5C:
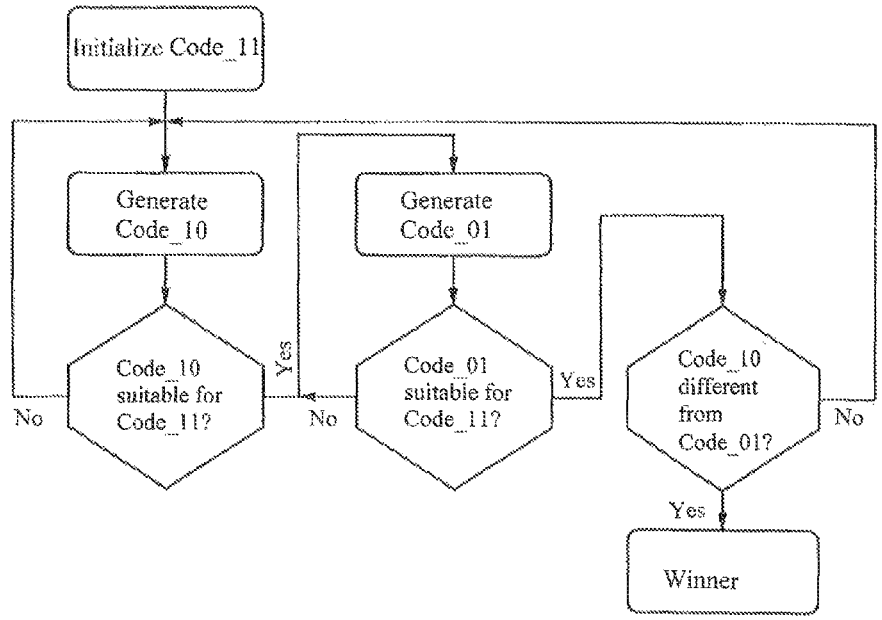
FIG. 5a: A representation of a 4-valued symbol according to an example embodiment of the present invention.
FIG. 5b: A relationship of symbol-specific OOK sequences to one another, to obtain a 4-valued symbol.
FIG. 5c: A flow diagram of an algorithm for generating OOK sequences for a 4-valued information symbol.
Figure 8A:
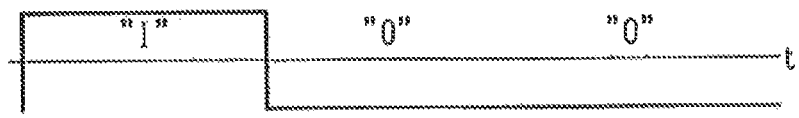
FIGS. 8a, 8b, 8c: A comparison of OOK and FSK.
Figure 8B:
Figure 8C:
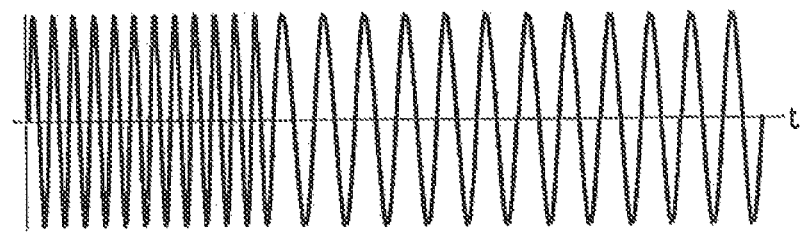

In an example embodiment, codes that satisfy these requirements can be found by a "trial and error" method which for a predetermined third code (Code_11) finds a first and a second code (Code_01 and Code_10) by repeated testing, that comply with the requirements of the table in FIG. 5b. The flow diagram of the method is shown in FIG. 5c.

In an example embodiment, the initial code for the algorithm according to FIG. 5c is the code Code_11=[1, 1, 0, 1, 0, 1, 0, 1, 1, 0, 0, 1, 1, 0, 1, 0, 1, 1, 1, 0, 0, 1, 0, 0, 1, 1, 1, 1]. With the interrupt criteria:

$$\{max(\Psi_{Code11\text{-}Code01}), max(\Psi_{Code11\text{-}Code10})\}>0.8$$

$$max(\Psi_{Code10\text{-}Code01})<0.7$$

$$\{HNV_{Code11}, HNV_{Code10}, HNV_{Code01}\}>1.5 \tag{7}$$

for example the following codes or signal sequences can be determined:
Code_10=[1, 1, 0, 1, 0, 1, 0, 1, 1, 0, 0, 1, 0, 1, 1, 0, 0, 0, 0, 0, 1, 0, 1, 0, 1, 0, 0, 1, 1, 1, 1];
Code_11=[1, 1, 0, 1, 0, 1, 0, 1, 1, 0, 0, 1, 1, 0, 1, 0, 1, 1, 0, 0, 1, 1, 1, 0, 1, 0, 0, 1, 1, 1, 1].
For the binary sequences shown in FIGS. 7a1, 7b1 and 7c1, the autocorrelation and cross-correlations are shown in FIGS. 7a2-7a4, 7b2-7b4 and 7c2-7c4 and the results of the correlations are summarized in the tables of FIGS. 6a and 6b.

The algorithm according to FIG. 5c for the conditions expressed by the equations (7) identifies a good code group with which the 4-valued information symbol can be obtained. With a HNV=2 all the codes have good self-correlations. The third code Code_11 ($S_3$) matches the first Code_10 ($S_1$) and the second code Code_01 ($S_2$) at:

$$x=max(\Psi_{Code11\text{-}Code01})\cdot 31=max(\Psi_{Code11\text{-}Code10}) \cdot 31=0.8603\cdot 31=27 \text{ bit} \tag{8}$$

In contrast, Code_01 matches Code_10 only at:

$$x=max(\Psi_{Code10\text{-}Code01})\cdot 31=0.6875\cdot 31=27 \text{ bit} \tag{9}$$

Thus, for operational purposes, for the example embodiment described here a correlation threshold of:

$$\Psi_{threshold} > \frac{23}{31} = 0.742 \tag{10}$$

can be chosen. Consequently, in example embodiments the predetermined cross-correlation threshold $\Psi_{threshold}$ is lower than any (maximum) autocorrelation value of the three signal sequences $S_1$; $S_2$; $S_3$ while at the same time the predetermined cross-correlation threshold $\Psi_{threshold}$ is higher than a (maximum) cross-correlation value between the first and second signal sequences $S_1$ (Code_10) and $S_2$ (Code_01).

Owing to the low correlation values max ($\Psi_{Code11\text{-}Code01}$) and max ($\Psi_{Code11\text{-}Code10}$), the 4-valued information symbol is now more susceptible to perturbations. With the calculation from equations (3) to (5), for the example embodiment the cross-correlation threshold $\Psi_{threshold}=0.742$ recommended above can be used to determine the number of bit errors tolerated:

$$x=(max(\Psi_{Code11\text{-}Code10})-\Psi_{threshold})\cdot 31=(0.8603- 0.742)\cdot 31=3.67 \tag{11}$$

For an implementation in relation to the 4-valued symbol an additional timer mechanism can be used, which for example checks cyclically whether interrupts have been triggered. Otherwise, a microcontroller cannot recognize the symbol corresponding to Code_00. A timer value can correspond for example to a symbol duration.

The features disclosed in the above description, the claims below and the drawings can be significant both individually and in any desired combination for the realization of the invention in its various versions.

Although many aspects of the present invention have been described in connection with a device, it is understood that those aspects also constitute a description of a corresponding method, so that a block or structural element of a device should also be understood as a corresponding method step or as a feature of a method step. Analogously, aspects that have been described in connection with, or as, a method step also constitute a description of a corresponding block or detail or feature of a corresponding device.

Depending on specified implementation requirements, example embodiments of the invention can be implemented in the hardware or software. The implementation can be carried out using a digital storage medium such as a floppy disk, a DVD, a Blu-ray disk, a CD, a ROM, a PROM, an EPROM, an EEPROM or a FLASH memory, a hard disk drive or some other magnetic or optical memory, in which electrically readable control signals are stored, which can or do co-operate with a programmable hardware component so that the process concerned is carried out.

A programmable hardware component can be in the form of a control unit, a processor, a computer CPU (Central Processing Unit), a computer, a computer system, an application-specific integrated circuit (ASIC), an integrated circuit (IC), a system-on-chip (SOC), a programmable logic element or a field programmable gate array (FPGA) with a microprocessor.

The digital storage medium can therefore be read by machine or computer means. Thus, many example embodiments comprise a data carrier with electronically readable control signals capable of co-operating with a computer system or a programmable hardware component in such manner that one of the processes described herein is carried out. Thus, an example embodiment is a data carrier (or a digital storage medium or a computer-readable medium) on which the program for carrying out one of the processes described herein is recorded.

In general, example embodiments of the present invention can be implemented as a program, firmware, computer program or computer program product with a program code or as data, such that the program code or data is or are effective for carrying out one of the processes when the program runs on a processor or a programmable hardware component. The program code or data can for example also be stored on a machine-readable carrier or data carrier. Among others, the program code or data can exist in the form of a source code, machine code or byte code as well as other intermediate codes.

Moreover, a further example embodiment is a data stream, signal sequence or a sequence of signals which represent the program for carrying out one of the processes described herein. The data stream, signal sequence or sequence of signals can for example be configured so as to be transferred by a data communication connection such as the Internet or some other network, in particular a Controller Area Network (CAN). Thus, example embodiments are also signal sequences that represent data and are suitable for transmission over a network or data communication connection, wherein the data represent the program.

A program according to an example embodiment can implement one of the processes while it is being carried out, for example in that it reads out storage locations or writes a datum or a plurality of data into them, whereby if necessary switching processes or other processes are generated in transistor structures, amplifier structures or in other electrical, optical or magnetic components or ones that operate according to some other functional principle. Correspondingly, by reading out a storage location, data, values, sensor values or other information can be obtained, determined or measured by a program. Thus, by reading out one or more storage locations a program can obtain, determine or measure parameters, values, measurements and other information, and by writing into one or more storage locations cause, authorize or carry out an action and control other equipment, machines and components.

The above-described example embodiments represent only an illustration of the principles of the present invention. It is understood that modifications and variations of the arrangements and details described herein will be clear to those with competence in the field. Accordingly, it is intended that the invention is limited only by the protective extent of the claims specified below and not by the specific details that have been presented in the context of the description and the explanation of the example embodiments.

INDEXES

100 Example embodiment of a device for transmitting an information symbol
110 Transmitter
200 Example embodiment of a receiver device
202 Receiver unit
205 Received signal
210 Correlation stage
220 Logic unit
305 Transmitted pulse
310 Interference pulse

The invention claimed is:

1. A device (100) for transmitting an information symbol of a symbol alphabet ($I_0$; $I_1$; $I_2$; $I_3$), the device comprising:
a transmitter (110) designed to transmit, for a first information symbol ($I_1$) of the symbol alphabet, a first signal sequence ($S_1$);
the transmitter (110) also being designed to transmit, for a second information symbol ($I_2$) of the symbol alphabet, a second signal sequence ($S_2$);
such that a cross-correlation, between the first signal sequence ($S_1$) and the second signal sequence ($S_2$), is below a predetermined cross-correlation threshold ($\Psi_{threshold}$); and
the transmitter (110) being designed to transmit, for a third information symbol ($I_3$) of the symbol alphabet, a third signal sequence ($S_3$);
such that both a cross-correlation, between the third signal sequence ($S_3$) and the first signal sequence ($S_1$), and also a cross-correlation, between the third signal sequence ($S_3$) and the second signal sequence ($S_2$), are both above the predetermined cross-correlation threshold ($\Psi_{threshold}$), and the predetermined cross-correlation threshold is smaller than any auto-correlation value, at a time point where lag is essentially zero, of the first, the second and the third signal sequences and larger than a cross-correlation value, at a time point where the lag is essentially zero, between the first and the second signal sequences.

2. The device (100) according to claim 1, wherein the first, the second and the third signal sequences are, in each case, binary sequences, and
the transmitter (110) is designed to transmit the first, the second and the third signal sequences by on-off-keying.

3. The device (100) according to claim 1, wherein the transmitter (110) is designed to transmit sequentially the first, the second and the third signal sequences.

4. The device (100) according to claim 1, wherein the transmitter (110) is designed to transmit no signal sequence for a fourth information symbol ($I_0$) of the symbol alphabet.

5. The device (100) according to claim 1, wherein the first, the second and the third information symbols ($I_0$; $I_1$; $I_2$; $I_3$) can be represented by a combination of binary digits and the transmitter (110) is designed:
to transmit the first signal sequence ($S_1$), if a first binary digit of the first information symbol corresponding thereto has a value of "1" and a second binary digit of the second information symbol corresponding to the second signal sequence ($S_2$) has a value of "0",
to transmit the second signal sequence ($S_2$), if the second binary digit of the information symbol corresponding thereto has a value of "1" and the first binary digit of the information symbol has a value of "0", and
to transmit the third signal sequence ($S_3$), if both the first and also the second binary digits of the information symbol have the value of "1".

6. The device (100) according to claim 1, wherein the transmitter (110) is designed for wireless transmission of the first, the second and the third signal sequences by way of a radio interface to a receiving device.

7. A device (200) for receiving an information symbol ($I_0$; $I_1$; $I_2$; $I_3$) from a received signal (205), the device comprising:
- a correlation stage (210) designed such that if a cross-correlation between a first signal sequence ($S_1$) that corresponds to a first information symbol ($I_1$) of a symbol alphabet ($I_0$; $I_1$; $I_2$; $I_3$) and the received signal (205) is above a predetermined correlation threshold ($\Psi_{threshold}$), the first information symbol ($I_1$) is registered,
- the correlation stage (210) is also designed such that if a cross-correlation between a second signal sequence ($S_2$), which corresponds to a second information symbol ($I_2$) of the symbol alphabet ($I_0$; $I_1$; $I_2$; $I_3$), and the received signal (205) is above the predetermined correlation threshold ($\Psi_{threshold}$), the second information symbol ($I_2$) is registered; and
- the correlation stage (210) is designed such that if a cross-correlation between the first signal sequence ($S_1$) and the received signal (205) and also a cross-correlation between the second signal sequence ($S_2$) and the received signal (205) are both above the predetermined correlation threshold ($\Psi_{threshold}$), a third information symbol ($I_3$) from the symbol alphabet ($I_0$; $I_1$; $I_2$; $I_3$) is registered;
- wherein the predetermined correlation threshold is smaller any auto-correlation value, at a time point where lag is essentially zero, of the first, second, and the third signal sequences and larger than a cross-correlation value, at a time point where the lag is essentially zero, between the first and the second signal sequences.

8. A method of transmitting an information symbol from a symbol alphabet ($I_0$; $I_1$; $I_2$; $I_3$), the method comprising:
- selecting a first signal sequence for a first information symbol from the symbol alphabet;
- transmitting with a transmitter, for the first information symbol ($I_1$) from the symbol alphabet, the first signal sequence ($S_1$);
- selecting a second signal sequence for a second information symbol from the symbol alphabet;
- transmitting with the transmitter, for the second information symbol ($I_2$) from the symbol alphabet, the second signal sequence ($S_2$);
- setting a predetermined cross-correlation threshold, and the first and the second signal sequences being selected such that a cross-correlation, between the first signal sequence ($S_1$) and the second signal sequence ($S_2$), is lower than the predetermined cross-correlation threshold ($\Psi_{threshold}$); and
- selecting a third signal sequence for a third information symbol of the symbol alphabet;
- transmitting with the transmitter, for the third information symbol ($I_3$) of the symbol alphabet, the third signal sequence ($S_3$),
- the predetermined cross-correlation threshold is smaller than any auto-correlation value, at a time point where lag is essentially zero, of the first, the second and the third signal sequences and larger than a cross-correlation value, at a time point where the lag is essentially zero, between the first and the second signal sequences,
- the third signal sequence being selected such that a cross-correlation, between the third signal sequence ($S_3$) and the first signal sequence ($S_1$), and also a cross-correlation, between the third signal sequence ($S_3$) and the second signal sequence ($S_2$), are both above the predetermined cross-correlation threshold ($\Psi_{threshold}$).

9. A method for receiving an information symbol ($I_0$; $I_1$; $I_2$; $I_3$) from a received signal (205), the method comprising:
- registering with a correlation stage, a first information symbol ($I_1$), if a cross-correlation between a first signal sequence ($S_1$), that corresponds to the first information symbol ($I_1$) from a symbol alphabet ($I_0$; $I_1$; $I_2$; $I_3$), and the received signal (205) is above a predetermined correlation threshold ($\Psi_{threshold}$);
- registering with the correlation stage a second information symbol ($I_2$), if a cross-correlation between a second signal sequence ($S_2$), that corresponds to a second information symbol ($I_2$) from the symbol alphabet ($I_0$; $I_1$; $I_2$; $I_3$), and the received signal (205) is above the predetermined correlation threshold ($\Psi_{threshold}$); and
- registering with the correlation stage a third information symbol ($I_3$) from the symbol alphabet ($I_0$; $I_1$; $I_2$; $I_3$), if a cross-correlation, between the first signal sequence ($S_1$) and the received signal (205), and also a cross-correlation, between the second signal sequence ($S_2$) and the received signal (205), are both above the predetermined correlation threshold ($\Psi_{threshold}$); and
- the predetermined correlation threshold is smaller than any auto-correlation value, at a time point where lag is essentially zero, of the first, the second and the third signal sequences and larger than a cross-correlation value, at a time point where the lag is essentially zero, between the first and the second signal sequences.

10. A computer program with a program code that operates on a programmable hardware component for carrying out a method of transmitting an information symbol from a symbol alphabet ($I_0$; $I_1$; $I_2$; $I_3$), the method comprising:
- transmitting with the programmable hardware component, for a first information symbol ($I_1$) from the symbol alphabet, a first signal sequence ($S_1$);
- transmitting with the programmable hardware component, for a second information symbol ($I_2$) from the symbol alphabet, a second signal sequence ($S_2$);
- such that a cross-correlation, between the first signal sequence ($S_1$) and the second signal sequence ($S_2$), is lower than a predetermined cross-correlation threshold ($\Psi_{threshold}$); and
- transmitting with the programmable hardware component, for a third information symbol ($I_3$) of the symbol alphabet, a third signal sequence ($S_3$);
- such that a cross-correlation, between the third signal sequence ($S_3$) and the first signal sequence ($S_1$), and also a cross-correlation, between the third signal sequence ($S_3$) and the second signal sequence ($S_2$), are both above the predetermined cross-correlation threshold ($\Psi_{threshold}$); and
- the predetermined cross-correlation threshold is smaller than any auto-correlation value, at a time point where lag is essentially zero, of the first, the second and the third signal sequences and larger than a cross-correlation value, at a time point where the lag is essentially zero, between the first and the second signal sequences.

\* \* \* \* \*